United States Patent
Allott et al.

(10) Patent No.: US 10,201,772 B2
(45) Date of Patent: Feb. 12, 2019

(54) FILTER ELEMENT AND FILTER SYSTEM

(71) Applicant: Caterpillar Inc., Peoria, IL (US)

(72) Inventors: Mark T. Allott, Mapleton, IL (US); Bryant A. Morris, Peoria, IL (US); Mark A. McElroy, Mapleton, IL (US)

(73) Assignee: Caterpillar Inc., Deerfield, IL (US)

( * ) Notice: Subject to any disclaimer, the term of this patent is extended or adjusted under 35 U.S.C. 154(b) by 164 days.

(21) Appl. No.: 15/345,593

(22) Filed: Nov. 8, 2016

(65) Prior Publication Data
US 2017/0209821 A1  Jul. 27, 2017

Related U.S. Application Data

(60) Provisional application No. 62/281,943, filed on Jan. 22, 2016.

(51) Int. Cl.

| | |
|---|---|
| *B01D 35/147* | (2006.01) |
| *B01D 29/31* | (2006.01) |
| *B01D 35/00* | (2006.01) |
| *B01D 35/153* | (2006.01) |
| *B01D 36/00* | (2006.01) |
| *B01D 29/15* | (2006.01) |

(52) U.S. Cl.
CPC ......... *B01D 35/1475* (2013.01); *B01D 29/15* (2013.01); *B01D 29/31* (2013.01); *B01D 35/005* (2013.01); *B01D 35/147* (2013.01); *B01D 35/153* (2013.01); *B01D 36/003* (2013.01); *B01D 2201/04* (2013.01); *B01D 2201/167* (2013.01); *B01D 2201/291* (2013.01); *B01D 2201/302* (2013.01); *B01D 2201/304* (2013.01); *B01D 2201/306* (2013.01); *B01D 2201/40* (2013.01); *B01D 2201/4092* (2013.01)

(58) Field of Classification Search
CPC .. B01D 35/1475; B01D 35/005; B01D 29/31; B01D 35/153; B01D 2201/306; B01D 2201/167
USPC ....... 210/249, 440, 441, 442, 443, 444, 429, 210/430, 437
See application file for complete search history.

(56) References Cited

U.S. PATENT DOCUMENTS

| | | |
|---|---|---|
| 5,770,054 A | 6/1998 | Ardes |
| 6,481,580 B1 | 11/2002 | Amstutz et al. |

(Continued)

FOREIGN PATENT DOCUMENTS

EP  1479427  11/2004

*Primary Examiner* — Madeline Gonzalez
(74) *Attorney, Agent, or Firm* — Finnegan, Henderson, Farabow, Garrett & Dunner, LLP

(57) ABSTRACT

A filter element may include a tubular element defining an internal space, and a retainer element associated with a first end of the tubular element, wherein the retainer element is configured to be coupled to a first housing. The filter element may also include a valve seat member in the internal space. The valve seat member may include a valve seat aperture configured to provide a fluid seal with a valve poppet. The filter element may further include first and second end caps associated with ends of the tubular element. The filter element may also include filter media around the tubular element, and the second end cap may be configured to provide a fluid seal between the filter element and a drain passage in a second housing, such that as the filter element is separated from the second housing, fluid flows from the filter element into the drain passage.

15 Claims, 14 Drawing Sheets

(56) References Cited

U.S. PATENT DOCUMENTS

| | | | |
|---|---|---|---|
| 6,488,845 | B1 | 12/2002 | Neufeld et al. |
| 6,837,993 | B2 | 1/2005 | Clausen et al. |
| RE38,917 | E | 12/2005 | Ardes |
| 7,204,370 | B2 | 4/2007 | Calusen et al. |
| 8,157,107 | B2 | 4/2012 | Weindorf |
| 8,168,066 | B2 | 5/2012 | Wieczorek et al. |
| 8,286,804 | B2 | 10/2012 | Weindorf |
| 8,298,409 | B2 | 10/2012 | Pflueger et al. |
| 8,440,081 | B2 | 5/2013 | Wieczorek |
| 8,613,854 | B2 * | 12/2013 | Jainek ................. B01D 35/147 210/136 |
| 8,877,053 | B2 | 11/2014 | Hacker |
| 2006/0207948 | A1 | 9/2006 | Hacker et al. |
| 2007/0241047 | A1 | 10/2007 | Roll et al. |

* cited by examiner

FILTER ELEMENT AND FILTER SYSTEM

RELATED APPLICATIONS

This application is a nonprovisional application of provisional U.S. Application No. 62/281,943, filed Jan. 22, 2016, the entire contents of which are expressly incorporated herein by reference

TECHNICAL FIELD

The present disclosure relates to a filter element, and more particularly, to a filter element for a filter system.

BACKGROUND

Engines including compression-ignition engines, spark-ignition engines, gasoline engines, gaseous fuel-powered engines, and other internal combustion engines, may operate more effectively and with greater service lives with oil from which contaminates have been removed. In addition, engines may operate more effectively with fuel from which contaminates have been removed prior to the fuel reaching a fuel injection system or combustion chamber of the engine. As a result, engines may be provided with one or more fluid filtration systems to remove contaminates from the oil and/or fuel.

Filter systems often include a filter element having filter media for removing the contaminates from fluid. The filter media may become more resistant to flow of the fluid through the filter media as trapped contaminates build up on or in the filter media. This results in the need to replace or clean the filter media to rehabilitate the effectiveness of the filter system. In addition, before the filter media is replaced or cleaned, it is desirable for the filter system to be capable of continuing to allow fluid to circulate in the fluid system in order for the engine to temporarily operate.

When the filter media of conventional filter systems is removed for replacement or cleaning, the act of removing the filter element, filter media, and any associated parts from the fluid system may generally result in spillage of some of the fluid as the filter media is removed. For example, some filter systems require draining of a filter canister when removing the filter element. This may result in spillage, for example, if service technicians are not careful to ensure that the drained fluid is captured by appropriate containers. Particularly when the fluid systems contain petroleum-based products such as oil or fuel, it is undesirable to expose the environment to such spillage. In addition, replacing or cleaning a filter element may be particularly unpleasant for service technicians when the fluid spills from the filter system onto their hands and clothing. As a result, it may be desirable to provide a filter system that reduces the likelihood of spillage when the filter media is replaced or cleaned.

A filter coupled to a cover is described in U.S. Pat. No. 8,157,107 B2 ("the '107 patent") to Weindorf issued Apr. 17, 2012. Specifically, the '107 patent describes a liquid filter having a filter housing with a drain passage. A filter element including a filter medium is arranged in the filter housing. A filter lid is configured to be connected to the filter housing. The filter lid has a filter bypass valve for bypassing the filter element when a pressure loss that is too high occurs when liquid passes through the filter medium of the filter element. First bayonet connectors are provided on the filter lid, and second bayonet connectors are provided on the filter element for connecting the filter element to the filter lid. A double-concentric seal is arranged on the filter element for closing off the drain passage.

Although the liquid filter of the '107 patent purports to facilitate decoupling of the filter element from the filter lid in a way that can be inexpensively and simply produced, it may still not address one or more of the possible drawbacks set forth above. For example, the double-concentric seal of the '107 patent may be complex and relatively expensive to produce. Furthermore, the arrangement of the '107 patent's liquid filter may result in undesirable spillage when removing the filter element from the filter housing.

The filter element and filter system disclosed herein may be directed to mitigating or overcoming one or more of the possible drawbacks set forth above.

SUMMARY

According to a first aspect, a filter element for a filter system may include a tubular element extending along a longitudinal axis between a first end and a second end and defining an internal space. The filter element may further include a retainer element associated with the first end of the tubular element, wherein the retainer element is configured to be coupled to a first housing. The filter element may also include a valve seat member in the internal space defined by the tubular element and positioned between the first end and the second end of the tubular element. The valve seat member may include a valve seat aperture configured to provide flow communication between the first end of the tubular element and the second end of the tubular element, and the valve seat aperture may be configured to provide a fluid seal with a valve poppet. The filter element may further include a first end cap associated with the first end of the tubular element, wherein the first end cap defines a first end cap opening configured to provide flow communication through the first end of the tubular element. The filter element may also include a second end cap associated with the second end of the tubular element, wherein the second end cap defines a second end cap opening configured to provide flow communication between the internal space of the tubular element and a second housing. The filter element may also include filter media around the tubular element and between the first and second end caps, with the filter media being configured to capture contaminates in fluid. The second end cap may be configured to provide a fluid seal between the filter element and a drain passage in the second housing, such that as the filter element is separated from the second housing, fluid flows from the filter element into the drain passage.

According to a further aspect, a filter system may include a first housing configured to be coupled to a filter element. The filter system may also include a second housing including an inlet port, an outlet port, and a drain passage, wherein the inlet port, the outlet port, and the drain passage are configured to provide flow communication between the filter system and a fluid system. The filter system may further include a filter element coupled to the first housing and received by the second housing. The filter element may include a tubular element extending along a longitudinal axis between a first end and a second end and defining an internal space, and a retainer element associated with the first end of the tubular element, wherein the retainer element is coupled to the first housing. The filter element may further include a valve seat member in the internal space defined by the tubular element and positioned between the first end and the second end of the tubular element. The valve seat member may include a valve seat aperture configured to provide flow communication between the first end of the tubular element and the second end of the tubular element. The valve seat aperture may be configured to provide a fluid seal with a valve poppet. The filter element may also include a first end cap associated with the first end of the tubular element, wherein the first end cap defines a first end cap opening configured to provide flow communication through the first end of the tubular element. The filter element may further include a second end cap associated with the second end of the tubular element, wherein the second end cap defines a second end cap opening configured to provide flow communication between the internal space of the tubular element and the second housing. The filter element may also include filter media around the tubular element and between the first and second end caps, with the filter media being configured to capture contaminates in fluid. The second end cap may be configured to provide a fluid seal between the filter element and the drain passage in the second housing, such that as the filter element is separated from the second housing, fluid flows from the filter element into the drain passage.

According to still a further aspect, a filter assembly may include a first housing configured to be coupled to a filter element, a second housing including an inlet port, an outlet port, and a drain passage, wherein the inlet port, the outlet port, and the drain passage are configured to provide flow communication between the filter system and a fluid system, and a filter element coupled to the first housing and received by the second housing. The filter element may include a tubular element extending along a longitudinal axis between a first end and a second end and defining an internal space, a retainer element associated with the first end of the tubular element, wherein the retainer element is configured to be coupled to a first housing, a valve seat member in the internal space defined by the tubular element and positioned between the first end and the second end of the tubular element, wherein the valve seat member includes a valve seat aperture configured to provide flow communication between the first end of the tubular element and the second end of the tubular element, and wherein the valve seat aperture is configured to provide a fluid seal with a valve poppet. The filter element may also include a first end cap associated with the first end of the tubular element, wherein the first end cap defines a first end cap opening configured to provide flow communication through the first end of the tubular element, a second end cap associated with the second end of the tubular element, wherein the second end cap defines a second end cap opening configured to provide flow communication between the internal space of the tubular element and a second housing, and filter media around the tubular element and between the first and second end caps, the filter media being configured to capture contaminates in fluid. The filter assembly may also include a coupler configured to couple the filter element to the first housing, wherein the coupler is configured to couple the filter element to the first housing via the retainer element, and wherein the coupler and the retainer element are configured such that the first housing is uncoupled from the filter element by rotating the coupler and retainer element relative to one another for less than a full turn.

DETAILED DESCRIPTION

FIGS. 1-15 illustrate exemplary embodiments of a filter system 10 and related parts. Filter system 10 may be used to filter fluids such as, for example, fuel, lubricants, coolants, and hydraulic fluid used by machines. For example, filter system 10 may be provided for internal combustion engines or hydraulic systems for use in machines, such as, for example, any type of ground-borne vehicle, such as an automobile, a truck, an agricultural vehicle, and/or a construction vehicle, such as, for example, a skid-steer loader, a wheel loader, a dozer, a track-type tractor, an excavator, a grader, an on-highway truck, an off-highway truck, and/or any other vehicle type known to a person skilled in the art. In addition, internal combustion engines may supply power to any stationary machines, such as, for example, a genset for generating electric power or a pump for pumping a fluid such as water, natural gas, or petroleum. The internal combustion engine may be, for example, a spark-ignition engine or a compression-ignition engine. Other types of engines are contemplated, such as, for example, rotary engines, gas turbine engines, and/or engines powered by gasoline, diesel fuel, bio-diesel, ethanol, methanol, and combinations thereof. Other uses are contemplated.

Figure 1:
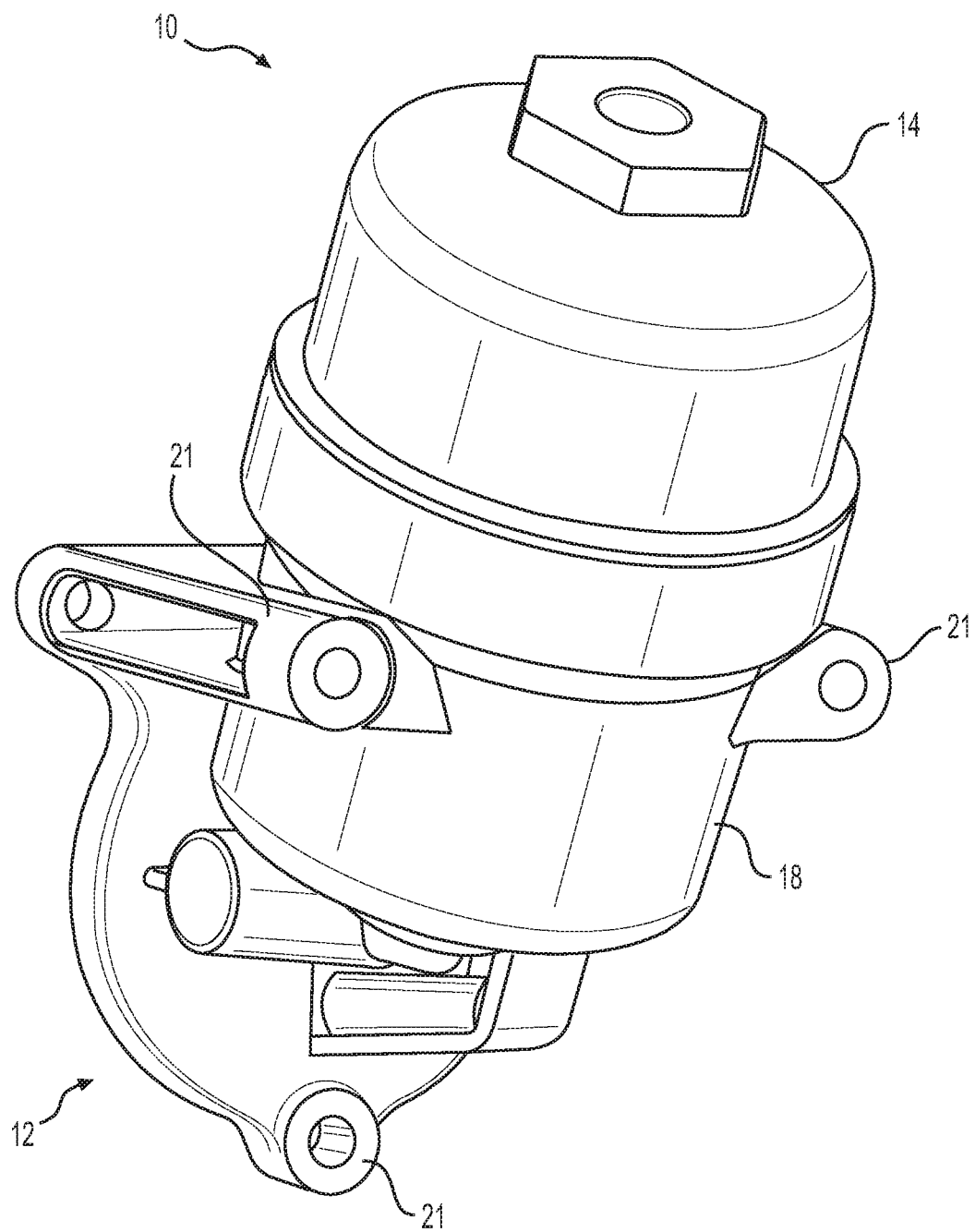
FIG. 1 is a perspective view of an exemplary embodiment of a filter system.
Figure 2:
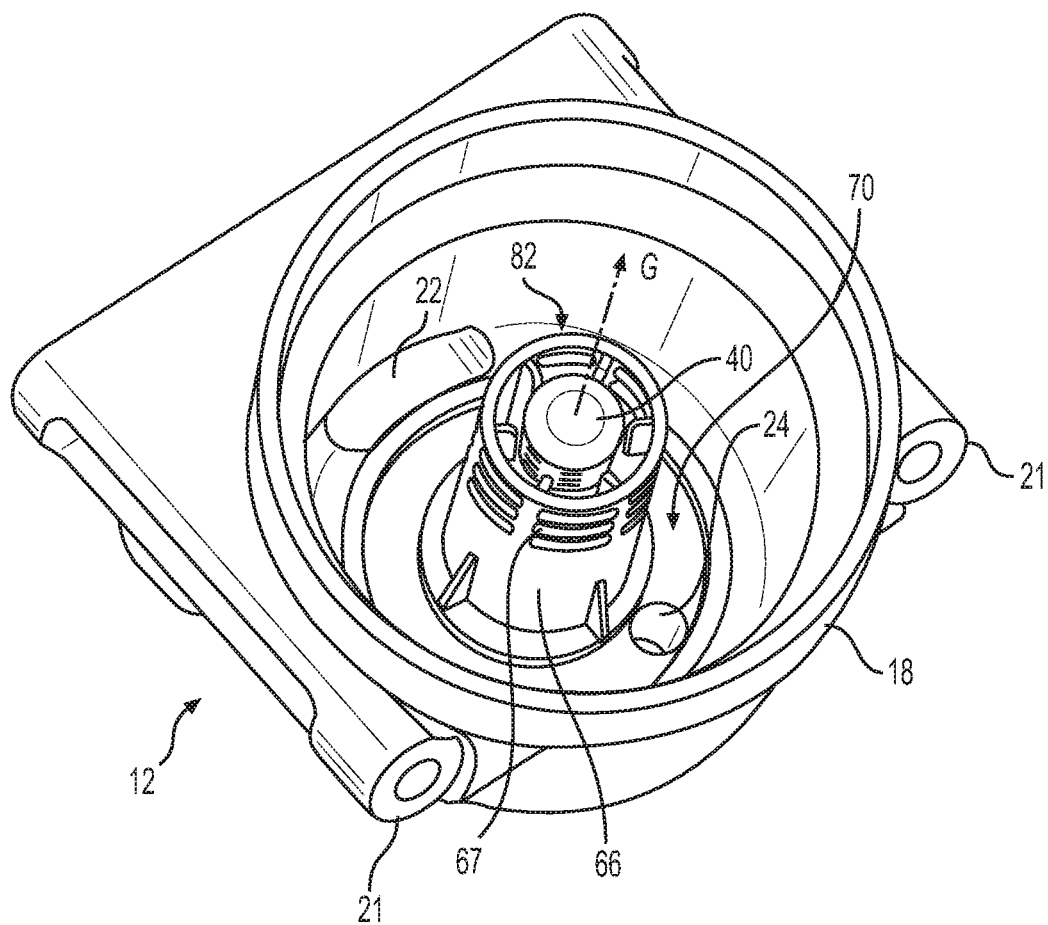
FIG. 2 is a perspective view of a portion of the exemplary embodiment shown in FIG. 1.
Figure 3:
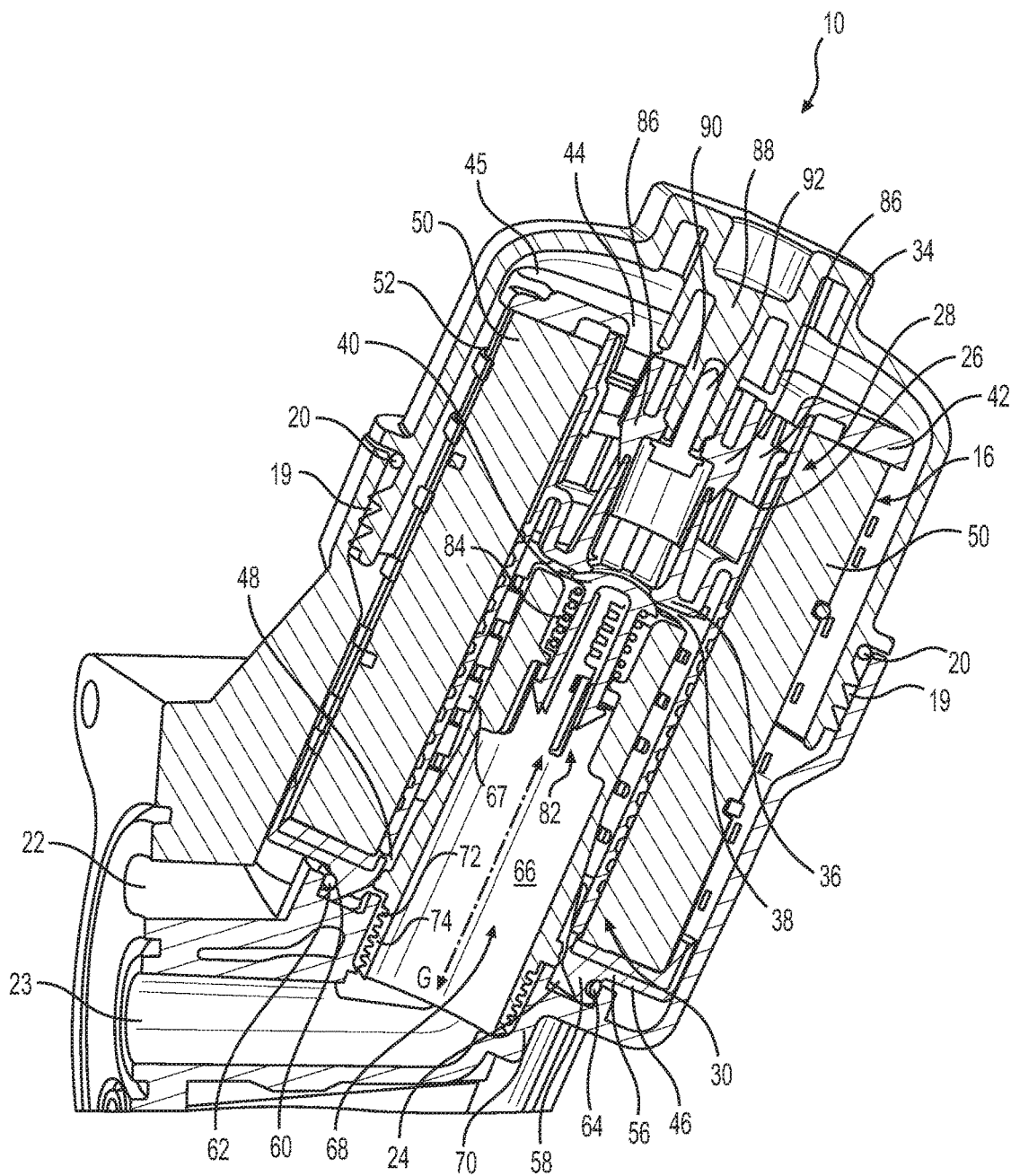
FIG. 3 is a side section view of an exemplary embodiment of a filter system.

Exemplary filter system 10 shown in FIGS. 1-9 includes a filter base 12 configured to couple filter system 10 to a machine (e.g., to an engine of a machine), a first housing 14 configured to be selectively coupled to a filter element 16, and a second housing 18 associated with filter base 12. In the exemplary embodiments shown, first housing 14 and second housing 18 are configured to be coupled to one another and contain filter element 16. For example, first housing 14 and second housing 18 may include complimentary threaded portions 19 configured to engage one another and secure first and second housings 14 and 18 to one another, for example, as shown in FIG. 3. Filter system 10 may also include a seal member 20 (e.g., an O-ring seal) associated with threaded portions 19 to provide a fluid seal when first and second housings 14 and 18 are secured to one another.

Exemplary filter base 12 includes bosses 21 (see, e.g., FIG. 1) configured to receive fasteners (not shown) such as bolts for coupling filter base 12 to a machine. As shown in FIG. 2, exemplary second housing 18 includes an inlet port 22 configured to receive fluid from a fluid system of the machine and provide flow communication into filter system 10. Exemplary second housing 18 also includes an outlet port 23 (see FIG. 3) configured to return filtered fluid to the fluid system of the machine, providing flow communication between filter system 10 and the fluid system. Exemplary second housing 18 also includes a drain passage 24 (see FIGS. 2-4) configured to return fluid in filter system 10 to the fluid system when filter element 16 is separated from second housing 18, as explained in more detail below.

Figure 4:
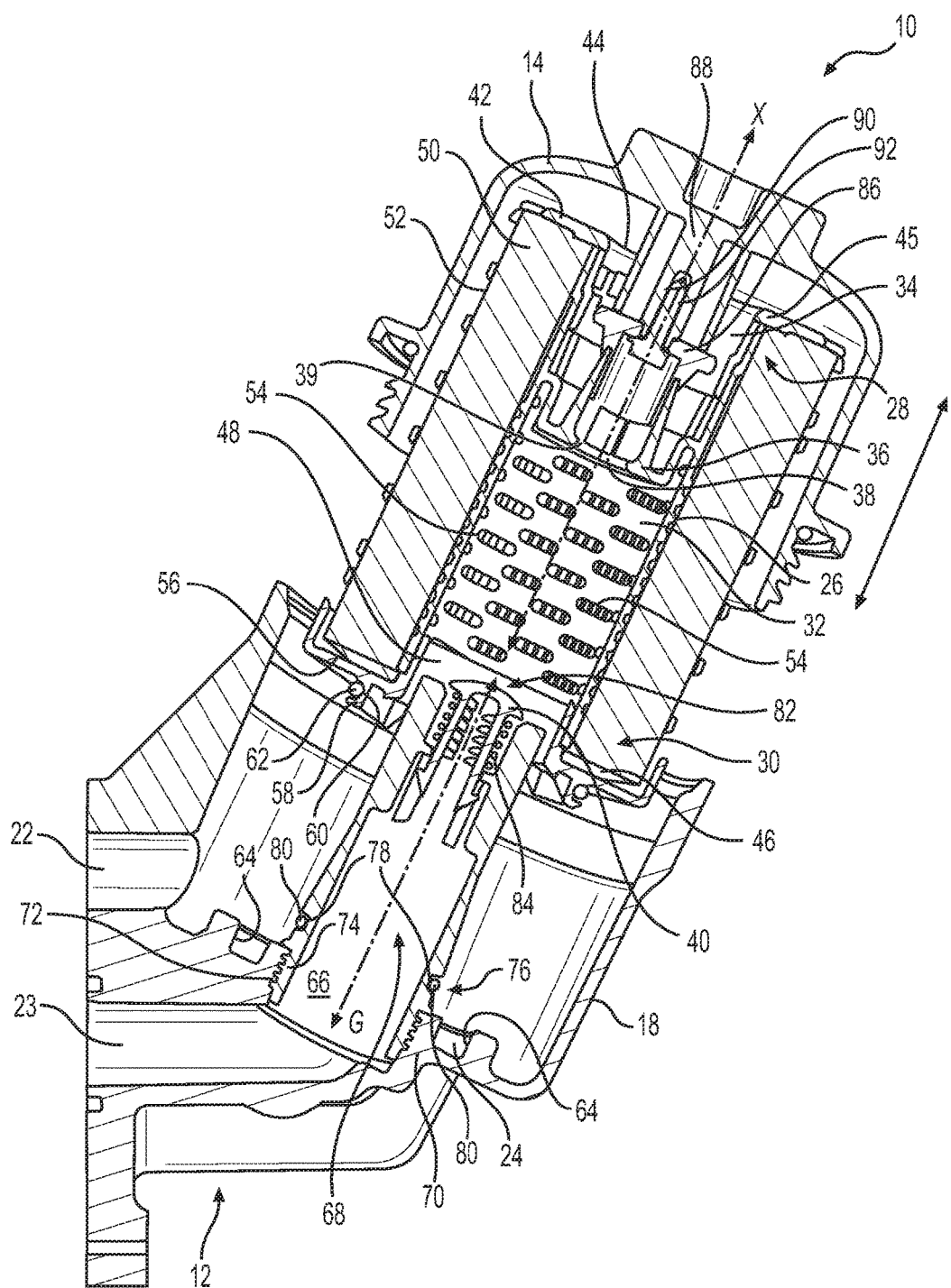
FIG. 4 is a side section view of the exemplary embodiment shown in FIG. 3 with one portion of the filter system being separated from another portion of the filter system.

As shown in FIGS. 3 and 4, exemplary filter element 16 of filter system 10 is coupled to first housing 14 and received by second housing 18, such that filter element 16 is contained within first housing 14 and second housing 18. Exemplary filter element 16 includes a tubular element 26 extending along a longitudinal axis X between a first end 28 and a second end 30 and defining an internal space 32. Exemplary filter element 16 also includes a retainer element 34 associated with first end 28 of tubular element 26, wherein retainer element 34 is coupled to first housing 14, for example, so that first housing 14 and filter element 16 may be inserted into and removed from second housing 18 as a single piece, for example, as shown in FIG. 4.

Figure 5:
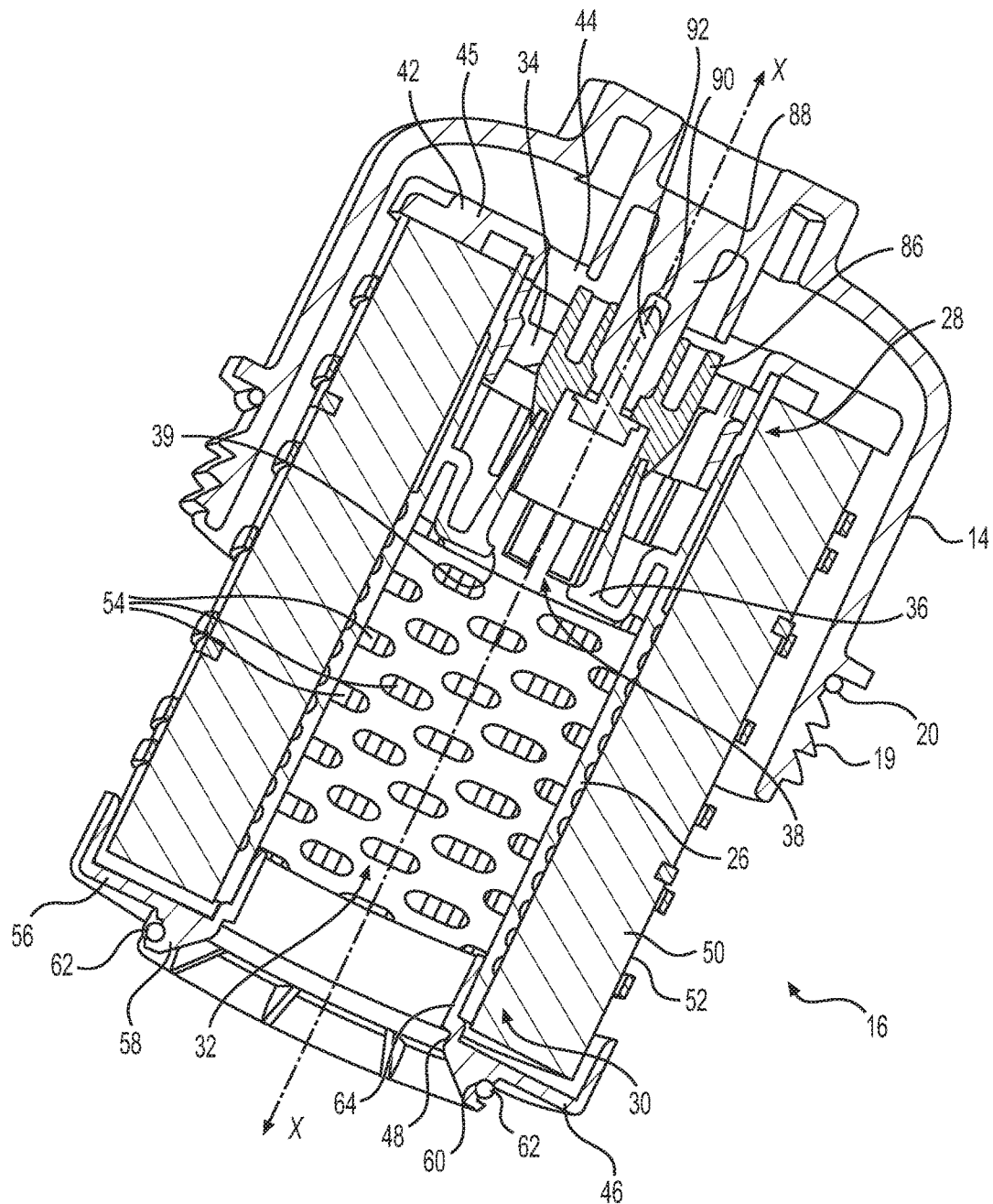
FIG. 5 is a side section view of one of the portions shown in FIG. 4.

As shown in FIGS. 3-5, exemplary filter element 16 may also include a valve seat member 36 in internal space 32 defined by tubular element 26 and positioned between first end 28 and second end 30 of tubular element 26. In the exemplary embodiment shown, valve seat member 36 includes a valve seat aperture 38 configured to provide flow communication between first end 28 of tubular element 26 and second end 30 of tubular element 26. As shown in FIG. 3, valve seat aperture 38 may be configured to provide a fluid seal with a valve poppet 40, for example, as explained herein. For example, valve seat aperture 38 may be circular and may include a periphery 39 (e.g., a chamfered periphery) configured to provide the fluid seal with valve poppet 40.

Exemplary filter element 16 also includes a first end cap 42 associated with first end 28 of tubular element 26. First end cap 42 may define a first end cap opening 44 configured to provide flow communication through first end 28 of tubular element 26. For example, first end cap 42 may include an annular wall 45 orthogonal (e.g., perpendicular) with respect to longitudinal axis X of tubular element 26 and coupled to first end 28 of tubular element 26. Annular wall 45 may define first end cap opening 44. First end cap 42 may be formed from plastic, metal, and/or similar materials. In the exemplary embodiment shown, filter element 16 also includes a second end cap 46 associated with second end 30 of tubular element 26. Second end cap 46 may define a second end cap opening 48 configured to provide flow communication between internal space 32 of tubular element 26 and second housing 18. Second end cap 46 may be formed from plastic, metal, and/or similar materials.

Exemplary filter element 16 also includes filter media 50 provided around tubular element 26 and between first and second end caps 42 and 46. Filter media 50 is configured to capture contaminates in fluid passing through filter system 10. Filter media 50 may be any filter media type known to those skilled in the art, such as, for example, foam-type, screen-type, paper-type (e.g., pleated or folded filter paper-type), and combinations thereof. According to some embodiments, filter media 50 may be a coalescing-type media configured to promote separation of a first fluid from a second fluid having different characteristics than the first fluid (e.g., water from fuel), such that one of the first fluid and the second fluid coalesces into droplets as it passes through the coalescing-type media, and such that the droplets of the first fluid form on the downstream surface of the coalescing-type media. According to some embodiments, filter media 50 may be a barrier-type media configured to separate the first fluid from the second fluid before the fluid passes through the barrier-type media, such that droplets of the first fluid form on the upstream surface of the barrier-type media, and the second fluid passes through the barrier-type media. According to some embodiments, filter media 50 may include combinations of the above-mentioned media types. Other types and configurations of filter media 50 are contemplated.

In the exemplary embodiment shown in FIGS. 1-9, fluid for filtration by filter system 10 enters filter system 10 via inlet port 22 of second housing 18, which is in flow communication with the fluid system of the associated machine. Fluid entering filter system 10 via inlet port 22 flows around an exterior surface 52 of filter media 50 and passes from exterior surface 52 into filter media 50. Tubular element 26 may include a plurality of tubular element apertures 54 configured to provide flow communication between filter media 50 and internal space 32 of tubular element 26. According to some embodiments, tubular element apertures 54 are present between valve seat member 36 and second end 30 of tubular element 26. Fluid flowing through filter media 50, thereby removes contaminates from the fluid, such as, for example, particulates and/or fluids different than the fluid being filtered. Upon flowing through filter media 50, the filtered fluid flows through tubular element apertures 54 into internal space 32. Internal space 32 is in flow communication with outlet port 23 of second housing 18, and upon flowing to outlet port 23, fluid exits filter system 10 and returns to the fluid system of the machine.

Figure 6:
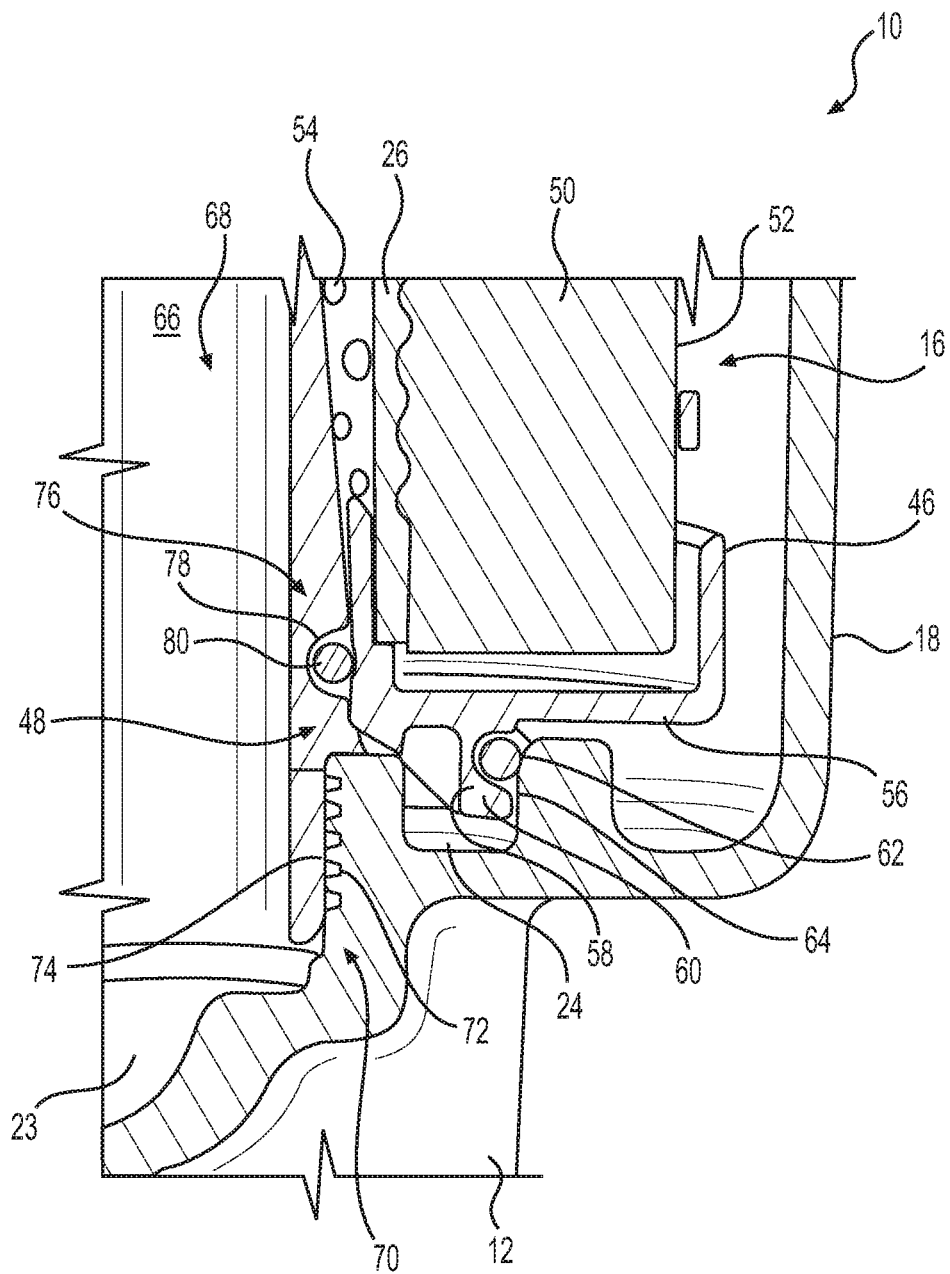
FIG. 6 is a side detail section view of a portion of the exemplary filter system shown in FIGS. 3-5.

According to some embodiments, for example, as shown in FIGS. 3 and 4, second end cap 46 may be coupled to second end 30 of tubular element 26 and filter media 50. According to some embodiments, second end cap 46 is configured to provide a fluid seal between filter element 16 and drain passage 24 in second housing 18, such that as filter element 16 is separated from second housing 18, fluid flows from filter element 16 into drain passage 24 of second housing 18. For example, as shown in FIGS. 3-5, exemplary second end cap 46 includes an annular wall 56 orthogonal (e.g., perpendicular) with respect to longitudinal axis X of tubular element 26 and an annular barrier 58 extending orthogonal (e.g., perpendicular) with respect to annular wall 56 in a direction opposite filter media 50. Exemplary annular wall 56 of second end cap 46 defines second end cap opening 48. Exemplary annular barrier 58 includes an annular recess 60, for example, facing radially outward with respect to annular barrier 58. The exemplary embodiment shown includes a seal member 62 (e.g., an O-ring seal) received in annular recess 60. As shown in FIGS. 3, 4, and 6, exemplary second housing 18 includes a radially inward facing annular seal face 64 providing a surface against which seal member 62 may abut and provide a fluid seal when filter element 16 is fully received in second housing 18. As shown in FIG. 4, as filter element 16 is withdrawn from second housing 18, seal member 62 disengages from seal face 64, thereby permitting fluid to flow from filter element 16 into drain passage 24 of second housing 18.

According to some embodiments, filter system 10 further includes a tubular guide 66 associated with (e.g., coupled to) second housing 18, such that tubular guide 66 provides flow communication between tubular element 26 and outlet port 23 via a plurality of tubular guide apertures 67, for example, as shown in FIG. 2. As shown in FIGS. 3 and 4, exemplary tubular guide 66 defines a passage 68 in flow communication with tubular guide apertures 67 and extending along a longitudinal axis G aligned with (e.g., co-linear with) longitudinal axis X of tubular element 26 (see FIGS. 3 and 4). Exemplary second housing 18 includes a circular recess 70 adjacent outlet port 23 configured to receive an end of tubular guide 66. For example, recess 70 may have internal threads 72 configured to engage external threads 74 on an end of tubular guide 66 adjacent outlet port 23, as shown in FIGS. 3 and 4. According to some embodiments, tubular guide 66 may be formed integrally with second housing 18 (e.g., via molding, casting, and/or machining), thereby forming a unitary structure.

According to some embodiments, tubular element 26 of filter element 16 receives at least a portion of tubular guide 66. For example, tubular guide 66 may nest within tubular element 26, as shown in FIG. 3. According to some embodiments, a fluid seal 76 is provided between tubular guide 66 and filter element 16, for example, as shown in FIGS. 4 and 6. In the exemplary embodiment shown, the radially exterior surface of an end of tubular guide 66 adjacent second end cap 46 includes a radially outward facing recess 78 and a seal member 80 (e.g., an O-ring seal) received in recess 78. In this exemplary arrangement, fluid seal 76 is provided between an inwardly facing radial surface of second end cap 18 of filter element 16 and tubular guide 66, for example, as shown in FIGS. 4 and 6. Fluid seal 76 serves to prevent fluid from flowing into tubular element 26 and/or tubular guide 66 without first flowing through filter media 50, except as noted below.

Exemplary filter system 10 further includes a bypass valve 82 associated with tubular guide 66, as shown in FIGS. 3 and 4, wherein bypass valve 82 includes valve poppet 40, which is configured move between a first position in which valve poppet 40 provides a fluid seal between valve poppet 40 and valve seat aperture 38 of valve seat member 36 (e.g., as shown in FIG. 3), and a second position in which flow communication is provided between first end 28 of tubular element 26 and outlet port 23 of second housing 18 via valve seat aperture 38 and tubular guide 66. According to some embodiments, bypass valve 82 further includes a biasing member 84 coupled to valve poppet 40 and tubular guide 66 and configured to bias valve poppet 40 against valve seat aperture 38. For example, biasing member 84 may be a helical spring (e.g., as shown) or any other type of member configured to apply a biasing force to valve poppet 40.

As shown in FIGS. 3 and 4, exemplary bypass valve 82 is configured such that when fluid pressure in first end 28 of tubular element 26 reaches a threshold pressure, valve poppet 40 moves to the second position and provides flow communication between first end 28 of tubular element 26 and outlet port 23 of second housing 18. This exemplary arrangement may be beneficial, for example, when filter media 50 provides sufficient resistance to flow between exterior surface 52 and tubular element apertures 54 to create the threshold pressure at first end 23 of tubular element 26. This resistance to flow may occur when filter media 50 has collected a sufficient amount of contaminates (e.g., trapped particulates) to inhibit flow through filter media 50. When this occurs, the force on valve poppet 40 due to the threshold pressure overcomes the biasing force of biasing member 84 and moves the valve poppet 40 to the second position, thereby opening bypass valve 82 to prevent the stoppage of fluid flow though filter system 10 and the fluid system of the machine. This may mitigate or prevent damage to the machine associated with the fluid system until filter media 50 may be serviced or replaced to restore flow through filter media 50.

According to some embodiments, filter system 10 may include a coupler 86 configured to couple filter element 16 to first housing 14. For example, coupler 86 may be configured to couple filter element 16 to first housing 14 via retainer element 34, as shown in FIGS. 3-5, 7, and 8.

For example, first housing 14 may include a boss 88 configured to extend toward filter element 16 when first housing 14 and filter element 16 are assembled to one another. Boss 88 may include a receiver 90 configured to engage a fastener 92 configured to couple coupler 86 to boss 88 of first housing 14. For example, receiver 90 and fastener 92 may each include cooperative threads configured to engage one another. According to some embodiments, fastener 92 may be a screw or similar fastener.

Figure 7:
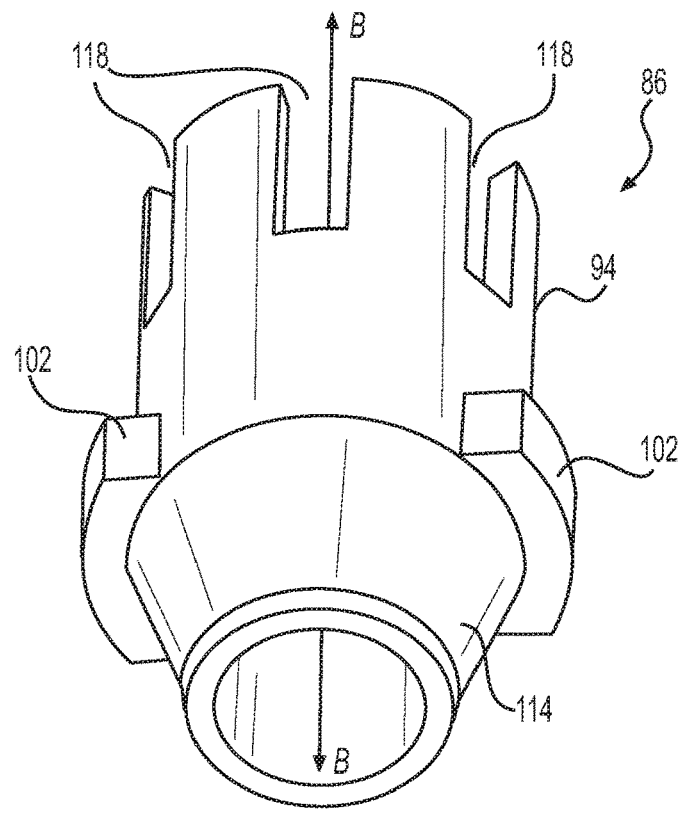
FIG. 7 is a perspective view of an exemplary embodiment of a portion of the exemplary filter system shown in FIGS. 3-5.

According to some embodiments, for example, as shown in FIG. 7, exemplary coupler 86 may include a tubular body 94, for example, having a circular cross-section. Tubular body 94 may extend along a longitudinal axis B, and when assembled with filter system 10, longitudinal axis B of tubular body 94 may be aligned with (e.g., co-linear with) longitudinal axis X of tubular element 26 of filter element 16, for example, as shown in FIGS. 3 and 4.

Figure 8:
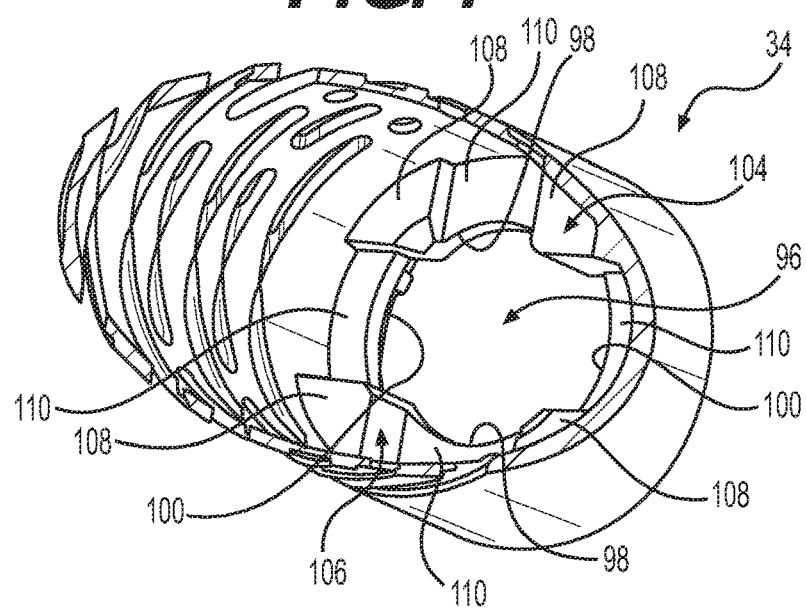
FIG. 8 is a perspective partial section view of a portion of the exemplary filter system shown in FIGS. 3-5.
Figure 9:
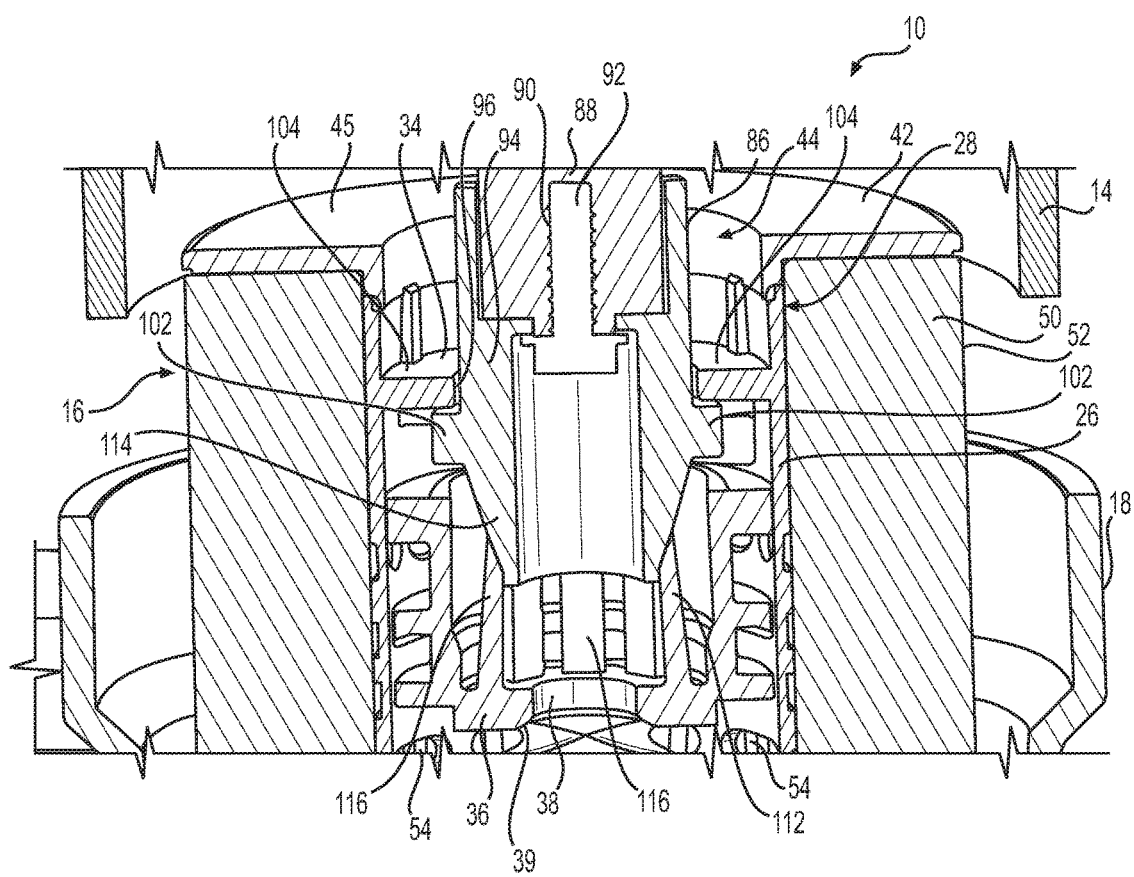
FIG. 9 is a perspective detail section view of a portion of the exemplary filter system shown in FIGS. 3-5.

According to some embodiments, coupler 86 and retainer element 34 are configured such that first housing 14 may be coupled and uncoupled from filter element 16 by rotating coupler 86 and retainer element 34 relative to one another for less than a full turn. For example, as shown in FIG. 8, retainer element 34 may include a retainer aperture 96 configured to receive coupler 86. In the exemplary embodiment shown, retainer aperture 96 includes a circular portion 98 and at least one lateral portion 100 (e.g., two opposing lateral portions) extending radially outward from circular portion 98. As shown in FIG. 7, exemplary coupler 86 includes at least one tab 102 (e.g., two opposing tabs) extending from tubular body 94 in a direction orthogonal (e.g., perpendicular) to longitudinal axis B of tubular body 94. Tab 102 is configured to pass through one of lateral portions 100 of retainer aperture 96 as tubular body 94 passes partially though circular portion 98 of retainer aperture 96.

According to some embodiments, retainer element 34 is associated with (e.g., is part of) first end 28 of tubular element 26, as shown in FIG. 8. In the exemplary embodiment shown, retainer element 34 includes a retainer barrier 104 defining retainer aperture 96. Exemplary retainer barrier 104 includes an internal face 106 facing toward second end 30 of tubular element 26, and exemplary internal face 106 includes four substantially sector-shaped raised surfaces 108 separated from one another by four substantially sector-shaped recessed surfaces 110.

During assembly according to the exemplary embodiment shown, coupler 86 is oriented circumferentially, such that tabs 102 are aligned with lateral portions 100 of retainer aperture 96, and the end of coupler 86 including tabs 102 is inserted through retainer aperture 96. Once coupler 86 is inserted into retainer aperture an amount sufficient for tabs 102 to clear raised surfaces 108, coupler 86 may be re-oriented circumferentially such that tabs 102 are circumferentially aligned with recessed surfaces 110 adjacent circular portions 98 of retainer aperture 96. Thereafter, tabs 102 may be moved axially against recessed surfaces 110 adjacent circular portion 98 of retainer aperture 96. In this exemplary manner, coupler 86 and retainer element 34 are configured such that first housing 14 may be coupled and uncoupled from filter element 16 by rotating coupler 86 and retainer element 34 relative to one another for less than a full turn (e.g., a quarter turn). In this exemplary manner, first housing 14 may be coupled and uncoupled from filter element 16 without the use of tools.

As shown in FIGS. 3-5 and 9, exemplary filter element 16 may include a biasing element 112 in internal space 32 of tubular element 26 and between valve seat member 36 and retainer element 34. Exemplary tubular body 94 of coupler 86 includes an exterior surface having a conical end 114 configured to engage biasing element 112, such that coupler 86 is biased toward retainer element 34 when conical end 114 of coupler 86 is received in retainer aperture 96 an amount sufficient for tabs 102 of tubular body to clear raised surfaces 108 retainer element 34. According to some embodiments, biasing element 112 is configured to provide flow communication between first end 28 of tubular element 26 and valve seat aperture 38. For example, in the exemplary embodiments shown in FIGS. 3-5 and 9, exemplary biasing element 112 includes a plurality of flexible fingers 116 configured to contact conical end 114 of tubular body 94 and bias coupler 86 toward retainer element 34, such that tabs 102 of coupler 86 abut recessed surfaces 110. Exemplary fingers 116 are configured to provide flow communication between first end 28 of tubular element 26 and valve seat aperture 38. This exemplary arrangement permits fluid to flow between fingers 116, through valve seat aperture 38, through tubular element 26, and into outlet port 23 when valve poppet 40 of bypass valve 82 moves to the second (open) position.

According to some embodiments, first housing 14 may be separated from filter element 16 by pushing together first housing 14 and filter element 16 to overcome biasing element 112 until tabs 102 of coupler 86 clear raised surfaces 110 of retainer barrier 104. Once tabs 102 have cleared raised surfaces 110, coupler 86 may be re-oriented circumferentially such that tabs 102 are circumferentially aligned with lateral portions 100 of retainer aperture 96, and coupler 86 may be withdrawn from retainer aperture 96 of retainer element 34. Because coupler 86 is coupled to first housing 14, when coupler 86 is separated from retainer element 34, first housing 14 is thereby separated from filter element 16. Thereafter, a new or refurbished filter element 16 may be coupled to first housing 14, and first housing 14 and filter element 16 may be assembled to second housing 18. In this exemplary manner, first housing 14 may be separated from a used filter element 16 by circumferentially rotating first housing 14 and filter element 16 (e.g., a quarter turn) with respect to one another, and pulling apart first housing 14 and filter element 16. As a result, according to some embodiments, first housing 14 and filter element 16 may be separated from second housing 18 without handling filter element 16.

According to some embodiments, for example, as shown in FIG. 7, the end of tubular body 94 of coupler 86 opposite conical end 114 may include notches 118 (e.g., castellation-like notches) for engaging boss 88 of first housing 14. For example, when coupler 86 is engaged with first housing 14, notches 118 of coupler 86 may fit around boss 88.

Figure 10:
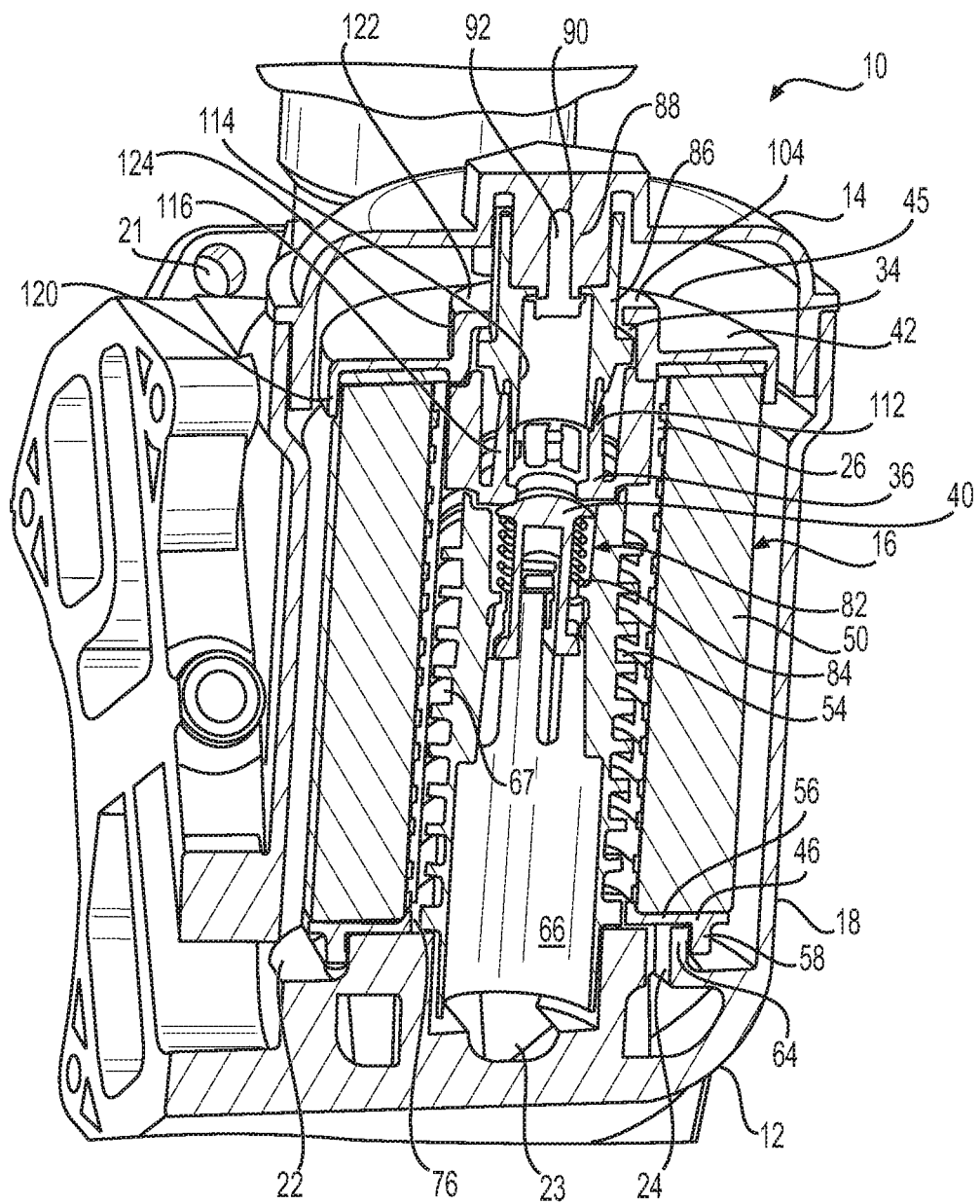
FIG. 10 is a perspective section view of an exemplary embodiment of a filter system.

FIGS. 10-13 show other exemplary embodiments of filter system 10. For example, filter system 10 shown in FIG. 10 is similar to exemplary filter system 10 shown in FIGS. 1-9, except first end cap 42 and second end 46 are different as compared to first end cap 42 and second end cap 46 of the exemplary embodiment shown in FIGS. 1-9. As shown in FIG. 10, exemplary first end cap 42 includes an annular flange 120 extending orthogonal (e.g., perpendicular) to annular wall 45 and in a direction toward filter media 50, such that a portion of exterior surface 52 of filter media is covered by flange 120. In addition, first end cap 42 shown in FIG. 10 also includes an extension 122 formed by a second annular flange 124 extending orthogonal (e.g., perpendicular) to annular wall 45 and in a direction away from filter media 50. An end of extension 122 remote from annular wall 45 includes retainer element 34. In this exemplary alternative configuration of first end cap 42, boss 88 of first housing is relatively shorter as compared to boss 88 of the exemplary embodiment shown in, for example, FIG. 3. According to some embodiments, first end cap 42 having a configuration as shown in FIG. 10 may be formed from a relatively harder material, with a relatively softer material adjacent filter media 50 to seal the end of filter media 50 adjacent annular wall 45 of first end cap 42.

Exemplary filter element 16 shown in FIGS. 10-13, includes an alternative embodiment of second end cap 46. (The exemplary embodiment shown in FIGS. 11-13 does not include the embodiment of first end cap 42 shown in FIG. 10.) Exemplary second end cap 46 shown in FIGS. 10-13 includes an alternative sealing arrangement. For example, instead of including separate seal members 62 and 80, for example, as shown in FIG. 6, exemplary second end cap 46 shown in FIGS. 10-13 includes seal members integrally formed as a unitary piece with second end cap 46.

Figure 11:
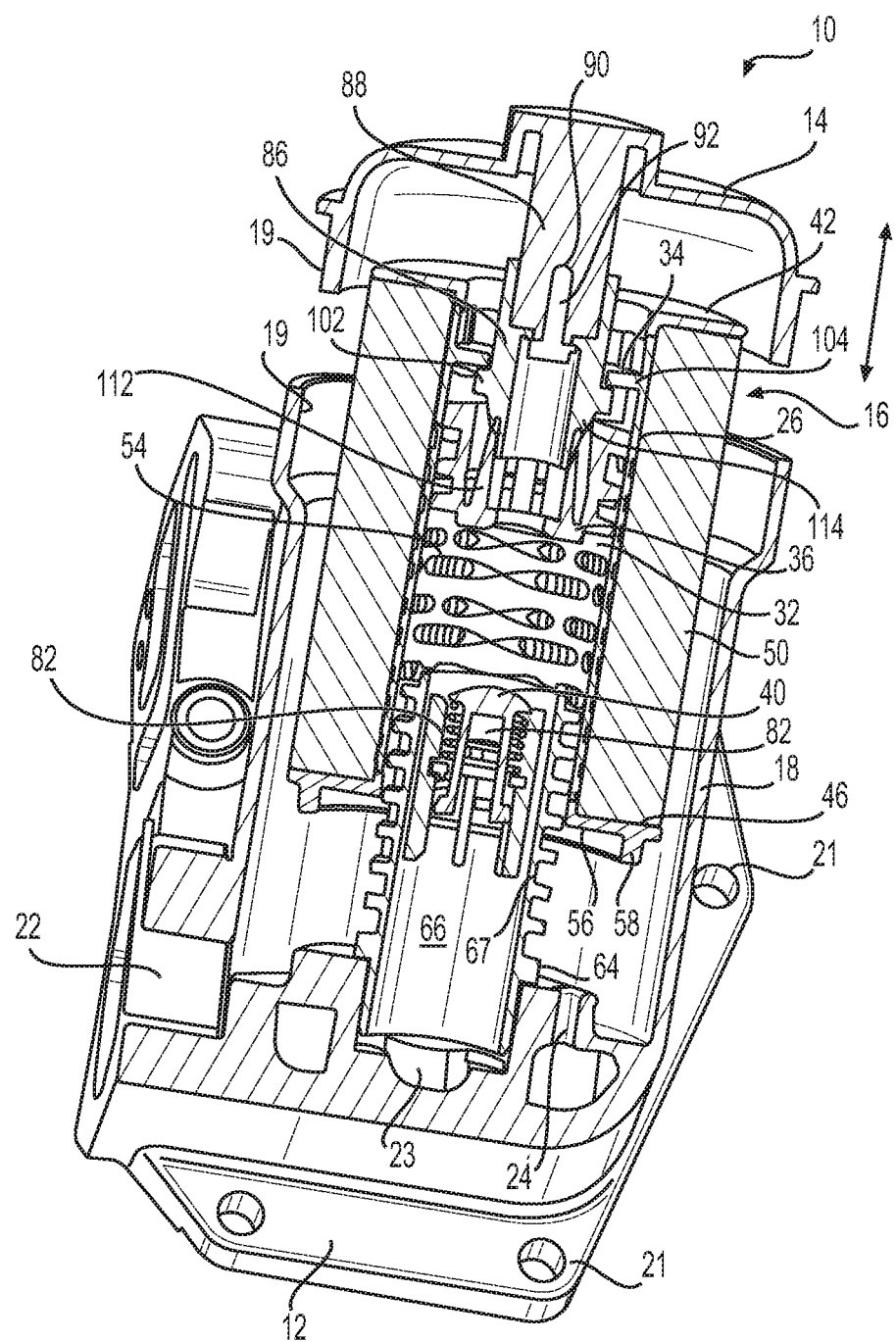
FIG. 11 is a perspective section view of an exemplary embodiment of a filter system with one portion of the filter system being separated from another portion of the filter system.
Figure 12:
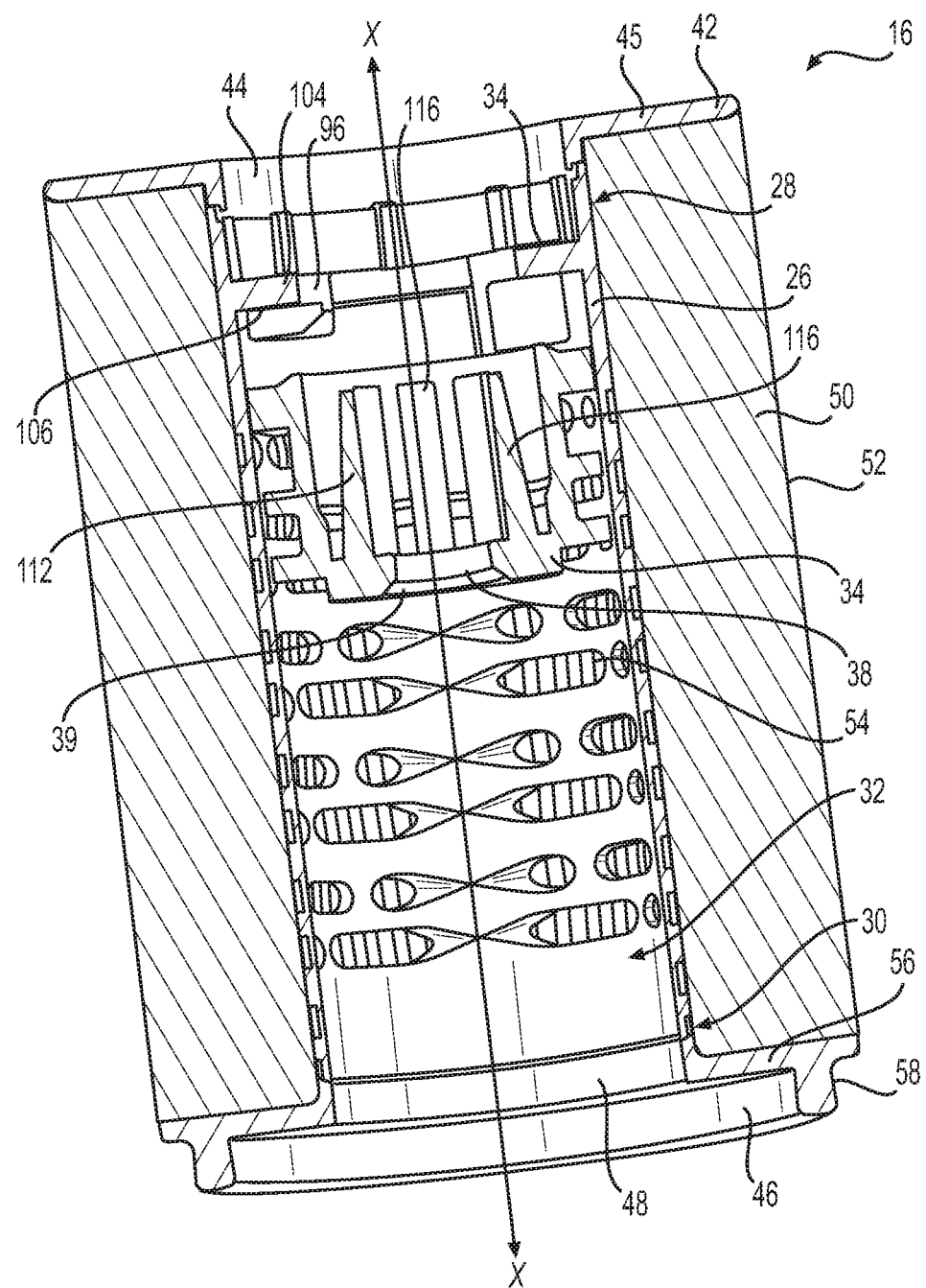
FIG. 12 is a perspective section view of an exemplary embodiment of a filter element.
Figure 13:
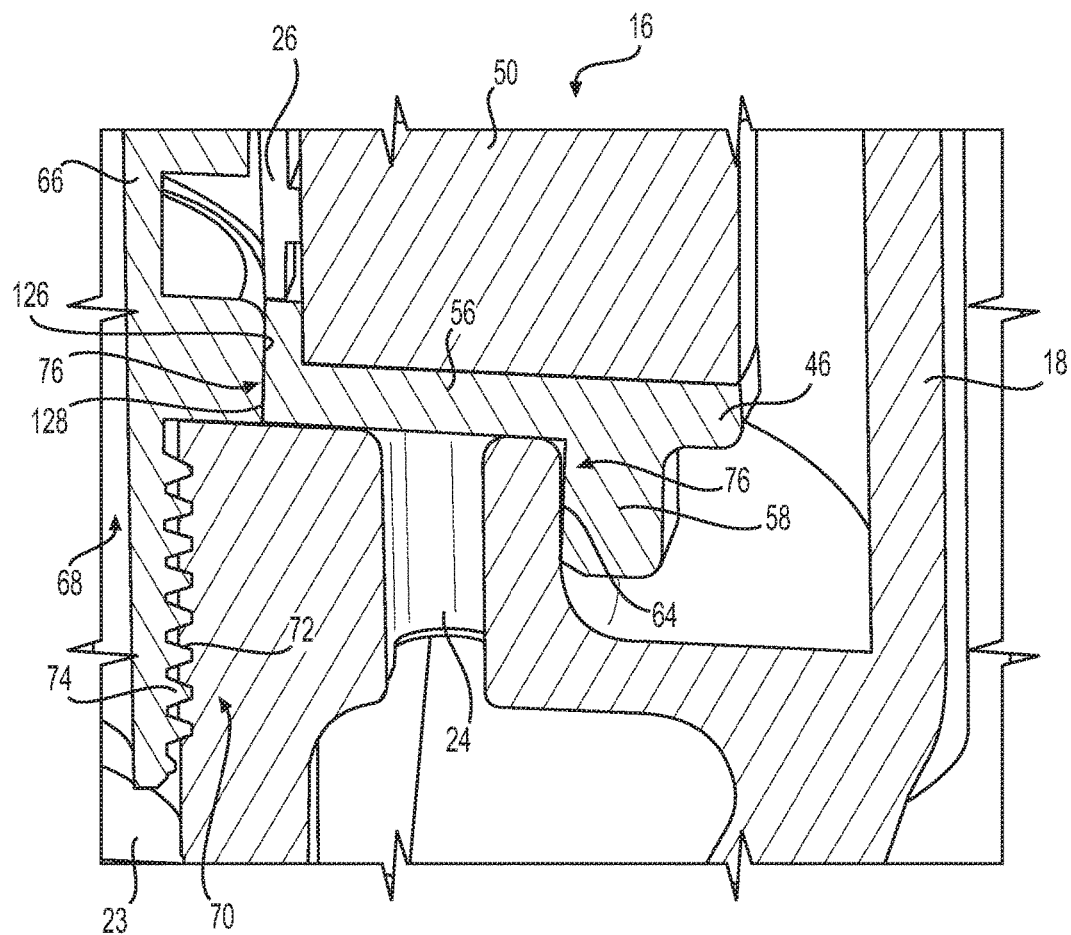
FIG. 13 is a perspective detail section view of a portion of the exemplary filter system shown in FIGS. 11 and 12.

For example, as shown in FIG. 13, similar to second end cap 46 shown in FIGS. 3-6, second end cap 46 shown in FIGS. 10-13 is configured to provide a fluid seal between filter element 16 and drain passage 24 in second housing 18, such that as filter element 16 is separated from second housing 18, fluid flows from filter element 16 into drain passage 24 of second housing 18. For example, as shown in FIGS. 10-13, exemplary second end cap 46 includes an annular wall 56 orthogonal (e.g., perpendicular) with respect to longitudinal axis X of tubular element 26 and an annular barrier 58 extending orthogonal (e.g., perpendicular) with respect to annular wall 56 in a direction opposite filter media 50. Exemplary annular wall 56 of second end cap 46 defines second end cap opening 48. Unlike the exemplary embodiment shown in FIGS. 3-6, exemplary annular barrier 58 does not include an annular recess. In the exemplary embodiment shown in FIGS. 10-13 annular barrier 58 itself provides a seal member. As shown in FIGS. 10-13, exemplary second housing 18 includes a radially outward facing annular seal face 64 providing a surface against which annular barrier 58 may abut and provide a fluid seal when filter element 16 is fully received in second housing 18. As shown in FIG. 11, as filter element 16 is withdrawn from second housing 18, seal member of annular barrier 58 disengages from seal face 64, thereby permitting fluid to flow from filter element 16 into drain passage 24 of second housing 18.

The exemplary embodiments shown in FIGS. 10-13 further include a tubular guide 66 associated with (e.g., coupled to) second housing 18, such that tubular guide 66 provides flow communication between tubular element 26 and outlet port 23 via a plurality of tubular guide apertures 67, for example, as shown in FIG. 2. As shown in FIGS. 10 and 11, exemplary tubular guide 66 defines a passage 68 in flow communication with tubular guide apertures 67 and extending along longitudinal axis G aligned with (e.g., co-linear with) longitudinal axis X of tubular element 26. Exemplary second housing 18 includes a circular recess 70 adjacent outlet port 23 configured to receive an end of tubular guide 66. For example, recess 70 may have internal threads 72 configured to engage external threads 74 on an end of tubular guide 66 adjacent outlet port 23, as shown in FIG. 13. According to some embodiments, tubular guide 66 may be formed integrally with second housing 18 (e.g., via molding, casting, and/or machining), thereby forming a unitary structure.

According to the exemplary embodiment shown in FIGS. 10-13, a fluid seal 76 is provided between tubular guide 66 and filter element 16, for example, as shown in FIGS. 10 and 13. In the exemplary embodiment shown, the radially exterior surface of an end of tubular guide 66 adjacent second end cap 46 includes a radially outward facing seal face 126. However, instead of including a separate seal member 80, such as the exemplary embodiment shown in FIGS. 4 and 6, in the exemplary embodiment shown in FIGS. 10-13, a fluid seal 76 is provided by second end cap 46 itself between an inwardly facing radial surface 128 of second end cap 46 of filter element 16 and seal face 126 of tubular guide 66. Fluid seal 76 serves to prevent fluid from flowing into tubular element 26 and/or tubular guide 66 without first flowing through filter media 50, except as otherwise noted herein.

According the embodiment shown in FIGS. 10-13, second end cap 46 may be formed of any material capable of forming a fluid seal between annular barrier 58 of second end cap 46 and radially outward facing annular seal face 64 of second housing 18, and/or between fluid seal 76 of second end cap 46 and radially outward facing seal face 126 of tubular guide 66. For example, second end cap 46 may be formed of elastic and/or resilient materials, such as, for example, polyurethane, having suitable sealing capabilities.

Figure 14:
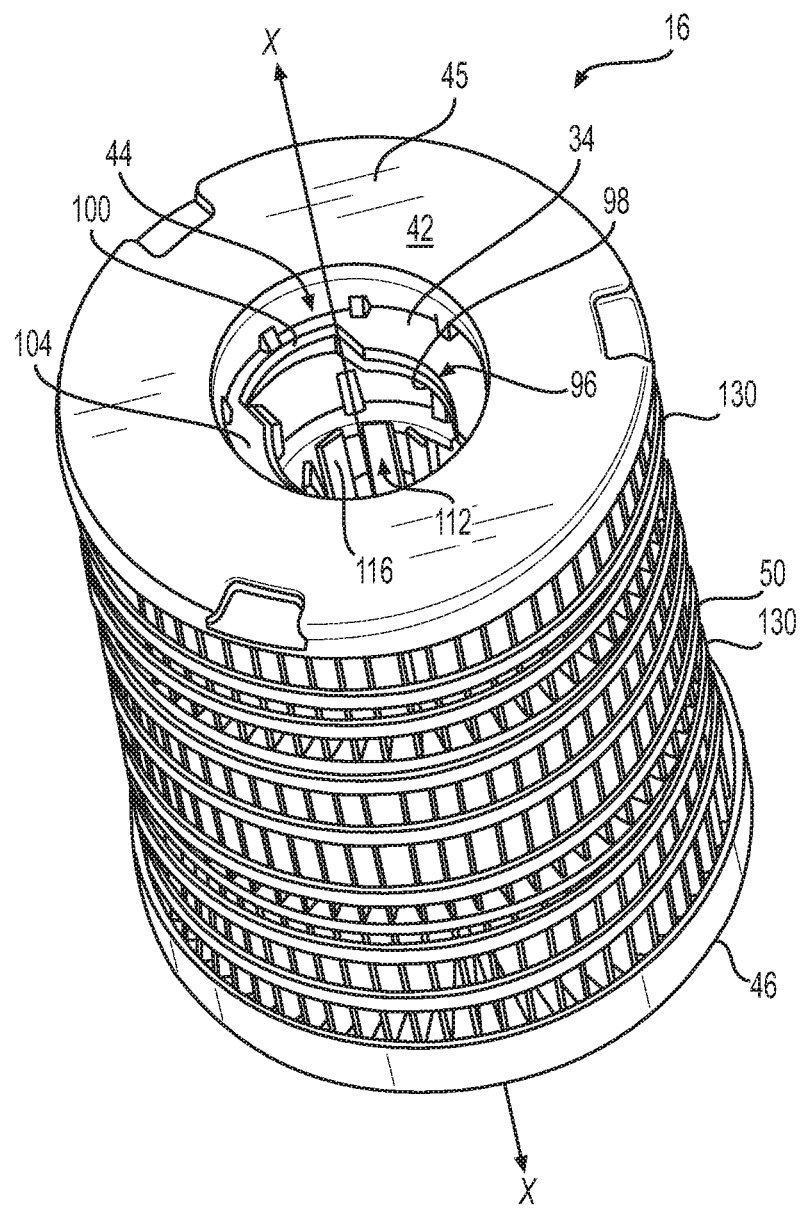
FIG. 14 is a top-side perspective view of an exemplary embodiment of a filter element.
Figure 15:
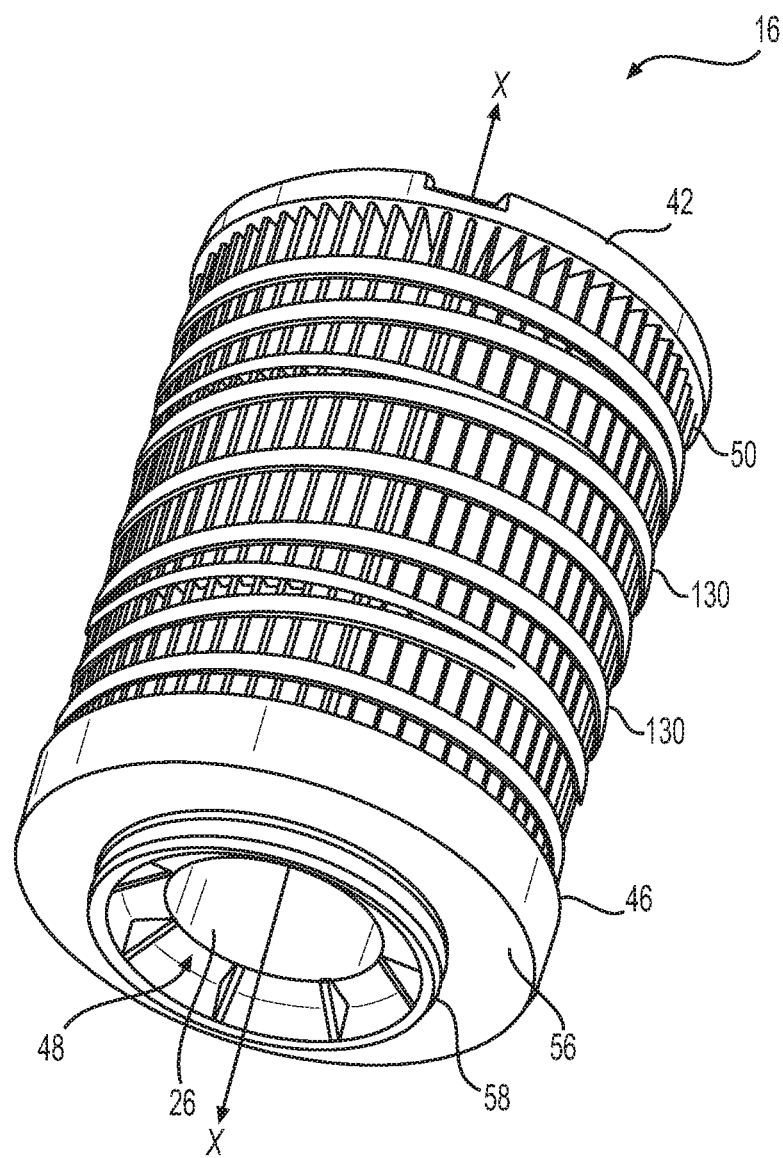
FIG. 15 is a bottom-side perspective view of an exemplary embodiment of a filter element.

As shown in FIGS. 14 and 15, for some embodiments of filter element 16, filter media 50 may be secured to filter element 16 via one or more rovings 130 (e.g., spirally-wrapped rovings). Although the exemplary embodiment shown in FIGS. 14 and 15 includes spirally-wound rovings 130, alternative ways to couple filter media 50 to filter element 16 are contemplated.

INDUSTRIAL APPLICABILITY

The filter system of the present disclosure may be useful for filtering fluids for a variety of machines including power systems, coolant systems, hydraulic systems, and/or air handling systems. For example, a supply of fluid may be supplied to filter system 10 via a fluid conduit, filtered via filter system 10, and recirculated into the fluid system via a conduit. For example, the fluid to be filtered may enter filter system 10 via inlet port 22 in second housing 18, pass through filter media 50 of filter element 16 where contaminates are removed from the fluid, through tubular element apertures 54, through tubular guide apertures 67, into internal space 32 of tubular element 26, and exit filter system 10 via outlet port 23 in second housing 18, and return to the fluid system.

According to some embodiments, filter system 10 may facilitate removal of filter element 16 from filter system 10 without resulting in significant (e.g., any) spillage of the fluid from filter system 10 during removal. For example, as described in relation to the exemplary embodiments shown in FIGS. 1-10, as filter element 16 is separated from second housing 18, seal member 62 of second end cap 46 disengages from seal face 64 of second housing 18, thereby permitting fluid in filter element 16 to flow from filter element 16 into drain passage 24 of second housing 18, which returns the drained fluid to the fluid system.

According to some embodiments, first housing 14 may be selectively coupled to filter element 16, for example, as described in relation to the exemplary embodiments shown in FIGS. 1-10. According to such embodiments, it is not necessary for a service technician removing filter element 16 from second housing 18 to soil their hands with fluid from filter system 10 because the service technician is able to remove filter element 16 by holding first housing 14 as a result of first housing 14 being coupled to filter element 16. In addition, according to some embodiments, after withdrawing first housing 14 and filter element 16 from second housing 18, first housing 14 may be separated from filter element 16 by pushing together first housing 14 and filter element 16, circumferentially rotating first housing 14 and filter element 16 a quarter turn with respect to one another, and pulling apart first housing 14 and filter element 16. For example, first housing 14 and filter element 16 may be separated from second housing 18 without handling filter element 16. First housing 14 and filter element 16 may be placed in a bag or receptacle, and first housing 14 may be separated from filter element 16, for example, as described above. Thereafter, first housing 14 may be coupled to a new or refurbished filter element 16, and first housing 14 and filter element 16 may be assembled to second housing 18. In this exemplary manner, filter element 16 may be replaced without significant (e.g., any) spillage of the fluid from filter system 10 during removal of filter element 16, thereby protecting the environment and resulting in ease of maintenance.

According to some embodiments, filter system 10 may include bypass valve 82, which may be configured to mitigate or prevent damage to a machine associated with the fluid system, for example, when filter media 50 of filter element 16 has captured sufficient contaminates to prevent fluid to flow through filter media 50 at a rate sufficient for operation of the machine. For example, exemplary bypass valve 82 disclosed herein may be configured such that when fluid pressure in first end 28 of tubular element 26 reaches a threshold pressure, valve poppet 40 moves from a first closed position to a second open position and provides flow communication between first end 28 of tubular element 26 and outlet port 23 of second housing 18. When filter media 50 provides sufficient resistance to flow between exterior surface 52 and tubular element apertures 54 to create the threshold pressure at first end 28 of tubular element 26, bypass valve 82 may open. This resistance to flow may occur when filter media 50 has collected a sufficient amount of contaminates (e.g., trapped particulates) to inhibit flow through filter media 50. When this occurs, the force on valve poppet 40 due to the threshold pressure overcomes the biasing force of biasing member 84 and moves the valve poppet 40 to the second (open) position, thereby opening bypass valve 82 to prevent the stoppage of fluid flow through filter system 10 and the fluid system of the machine. In this exemplary manner, damage to the machine associated with the fluid system may be mitigated or prevented until filter media 50 may be serviced or replaced to restore flow through filter media 50.

It will be apparent to those skilled in the art that various modifications and variations can be made to the disclosed, exemplary filter element and filter system. Other embodiments will be apparent to those skilled in the art from consideration of the specification and practice of the disclosed examples. It is intended that the specification and examples be considered as exemplary only, with a true scope being indicated by the following claims and their equivalents.

What is claimed is:

1. A filter element for a filter system, the filter element comprising:
   a tubular element extending along a longitudinal axis between a first end and a second end and defining an internal space;
   a retainer element associated with the first end of the tubular element, wherein the retainer element is configured to be coupled to a first housing;
   a valve seat member in the internal space defined by the tubular element and positioned between the first end and the second end of the tubular element, wherein the valve seat member includes a valve seat aperture configured to provide flow communication between the first end of the tubular element and the second end of the tubular element, and wherein the valve seat aperture is configured to provide a fluid seal with a valve poppet;
   a biasing element between the valve seat member and the retainer element, wherein the biasing element is configured to bias a coupler received from the first end of the tubular element toward the retainer element;
   a first end cap associated with the first end of the tubular element, wherein the first end cap defines a first end cap opening configured to provide flow communication through the first end of the tubular element;
   a second end cap associated with the second end of the tubular element, wherein the second end cap defines a second end cap opening configured to provide flow communication between the internal space of the tubular element and a second housing; and
   filter media around the tubular element and between the first and second end caps, the filter media being configured to capture contaminates in fluid,
   wherein the second end cap is configured to provide a fluid seal between the filter element and a drain passage in the second housing, such that as the filter element is separated from the second housing, fluid flows from the filter element into the drain passage.

2. The filter element of claim 1, wherein the tubular element includes a plurality of apertures providing flow communication between the filter media and the internal space.

3. The filter element of claim 2, wherein the plurality of apertures are present between the valve seat member and the second end of the tubular element.

4. The filter element of claim 1, wherein the retainer element includes a retainer aperture configured to receive a coupler configured to couple the filter element to the first housing.

5. The filter element of claim 4, wherein the retainer aperture includes a circular portion and a lateral portion extending from a portion of the circular portion.

6. The filter element of claim 1, wherein the valve seat aperture is circular and includes a periphery configured to provide the fluid seal with the valve poppet.

7. The filter element of claim 1, wherein the first end cap includes a first annular wall orthogonal with respect to the longitudinal axis and coupled to the first end of the tubular element and the filter media, and wherein the first annular wall defines the first end cap opening.

8. The filter element of claim 1, wherein the second end cap includes a second annular wall orthogonal with respect to the longitudinal axis and coupled to the second end of the tubular element and the filter media, and wherein the second annular wall defines the second end cap opening.

9. A filter system comprising:
   a first housing configured to be coupled to a filter element;
   a second housing including an inlet port, an outlet port, and a drain passage, wherein the inlet port, the outlet port, and the drain passage are configured to provide flow communication between the filter system and a fluid system;
   a filter element coupled to the first housing and received by the second housing, the filter element including:
      a tubular element extending along a longitudinal axis between a first end and a second end and defining an internal space;
      a retainer element associated with the first end of the tubular element, wherein the retainer element is coupled to the first housing;
      a valve seat member in the internal space defined by the tubular element and positioned between the first end and the second end of the tubular element, wherein the valve seat member includes a valve seat aperture configured to provide flow communication between the first end of the tubular element and the second end of the tubular element, and wherein the valve seat aperture is configured to provide a fluid seal with a valve poppet;
      a first end cap associated with the first end of the tubular element, wherein the first end cap defines a first end cap opening configured to provide flow communication through the first end of the tubular element;
      a second end cap associated with the second end of the tubular element, wherein the second end cap defines a second end cap opening configured to provide flow communication between the internal space of the tubular element and the second housing; and
      filter media around the tubular element and between the first and second end caps, the filter media being configured to capture contaminates in fluid,
      wherein the second end cap is configured to provide a fluid seal between the filter element and the drain passage in the second housing, such that as the filter element is separated from the second housing, fluid flows from the filter element into the drain passage; and
   a tubular guide associated with the second housing, such that the tubular guide provides flow communication between the tubular element and the outlet port, wherein the tubular element of the filter element receives at least a portion of the tubular guide.

10. The filter system of claim 9, further including a bypass valve associated with the tubular guide, wherein the bypass valve includes the valve poppet configured to move between a first position in which the valve poppet provides a fluid seal between the valve poppet and the valve seat aperture of the valve seat member, and a second position in which flow communication is provided between the first end of the tubular element and the outlet port of the second housing via the valve seat aperture and the tubular guide.

11. The filter system of claim 10, wherein the bypass valve further includes a biasing member coupled to the valve poppet and the tubular guide and configured to bias the valve poppet against the valve seat aperture.

12. The filter system of claim 11, wherein the bypass valve is configured such that when fluid pressure in the first end of the tubular element reaches a threshold pressure, the valve poppet moves to the second position and provides flow communication between the first end of the tubular element and the outlet port of the second housing.

13. The filter system of claim 9, further including a fluid seal between the tubular guide and the filter element.

14. The filter system of claim 9, further including a coupler coupling the filter element to the first housing, wherein the coupler couples the filter element to the first housing via the retainer element, and wherein the coupler and the retainer element are configured such that the first housing is uncoupled from the filter element by rotating the coupler and retainer element relative to one another for less than a full turn.

15. A filter assembly comprising:
a first housing configured to be coupled to a filter element;
a second housing including an inlet port, an outlet port, and a drain passage, wherein the inlet port, the outlet port, and the drain passage are configured to provide flow communication between the filter assembly and a fluid system; and
a filter element coupled to the first housing and received by the second housing, the filter element including:
a tubular element extending along a longitudinal axis between a first end and a second end and defining an internal space;
a retainer element associated with the first end of the tubular element, wherein the retainer element is configured to be coupled to the first housing;
a valve seat member in the internal space defined by the tubular element and positioned between the first end and the second end of the tubular element, wherein the valve seat member includes a valve seat aperture configured to provide flow communication between the first end of the tubular element and the second end of the tubular element, and wherein the valve seat aperture is configured to provide a fluid seal with a valve poppet;
a first end cap associated with the first end of the tubular element, wherein the first end cap defines a first end cap opening configured to provide flow communication through the first end of the tubular element;
a second end cap associated with the second end of the tubular element, wherein the second end cap defines a second end cap opening configured to provide flow communication between the internal space of the tubular element and the second housing; and
filter media around the tubular element and between the first and second end caps, the filter media being configured to capture contaminates in fluid;
a coupler configured to couple the filter element to the first housing, wherein the coupler is configured to couple the filter element to the first housing via the retainer element, and wherein the coupler and the retainer element are configured such that the first housing is uncoupled from the filter element by rotating the coupler and retainer element relative to one another for less than a full turn, wherein the coupler includes a tubular body extending along a longitudinal axis, such that the longitudinal axis of the tubular body is aligned with the longitudinal axis of the tubular element of the filter element, and wherein the retainer element includes a retainer aperture configured to receive the coupler, wherein the retainer aperture includes a circular portion and a lateral portion extending radially outward from the circular portion, and wherein the coupler includes a tab extending from the tubular body and configured to pass through the lateral portion of the retainer aperture as the tubular body passes partially though the circular portion of the retainer aperture; and
a biasing element in the internal space of the tubular element and between the valve seat member and the retainer element, wherein the tubular body of the coupler includes an exterior surface having a conical end configured to engage the biasing element, such that the coupler is biased toward the retainer element.

* * * * *